(12) United States Patent
Blum et al.

(10) Patent No.: US 7,462,473 B2
(45) Date of Patent: Dec. 9, 2008

(54) USE OF FOOD COLOURS TO DYE ENZYME SOLUTIONS

(75) Inventors: Roger Blum, Hamburg (DE); Sabine Kadow, Hamburg (DE)

(73) Assignee: Eppendorf AG, Hamburg (DE)

( * ) Notice: Subject to any disclaimer, the term of this patent is extended or adjusted under 35 U.S.C. 154(b) by 639 days.

(21) Appl. No.: 10/624,192

(22) Filed: Jul. 21, 2003

(65) Prior Publication Data

US 2004/0023352 A1 Feb. 5, 2004

Related U.S. Application Data

(63) Continuation of application No. 09/957,658, filed on Sep. 17, 2001, now abandoned.

(51) Int. Cl.
*C12N 9/00* (2006.01)

(52) U.S. Cl. ....................................................... 435/183

(58) Field of Classification Search .................. 435/183
See application file for complete search history.

(56) References Cited

U.S. PATENT DOCUMENTS

| | | | | |
|---|---|---|---|---|
| 2,774,673 | A | * | 12/1956 | Young ......................... 426/63 |
| 4,837,043 | A | | 6/1989 | Engelmann et al. |
| 5,556,761 | A | | 9/1996 | Phillips |
| 5,773,592 | A | | 6/1998 | Mills |
| 5,851,817 | A | | 12/1998 | Hardy et al. |
| 6,200,762 | B1 | | 3/2001 | Zlokarnik et al. |
| 2004/0166028 | A1 | | 8/2004 | Husar et al. |

FOREIGN PATENT DOCUMENTS

| | | |
|---|---|---|
| DE | 3631195 A1 | 11/1987 |
| DE | 197 37 173 A1 | 3/1999 |

* cited by examiner

*Primary Examiner*—Michael V Meller
(74) *Attorney, Agent, or Firm*—McDermott Will & Emery LLP

(57) ABSTRACT

The present invention relates to the use of food colors for coloring enzyme solutions, to enzyme solutions provided with food colors as well as their use.

5 Claims, 9 Drawing Sheets

USE OF FOOD COLOURS TO DYE ENZYME SOLUTIONS

Figure 1A:
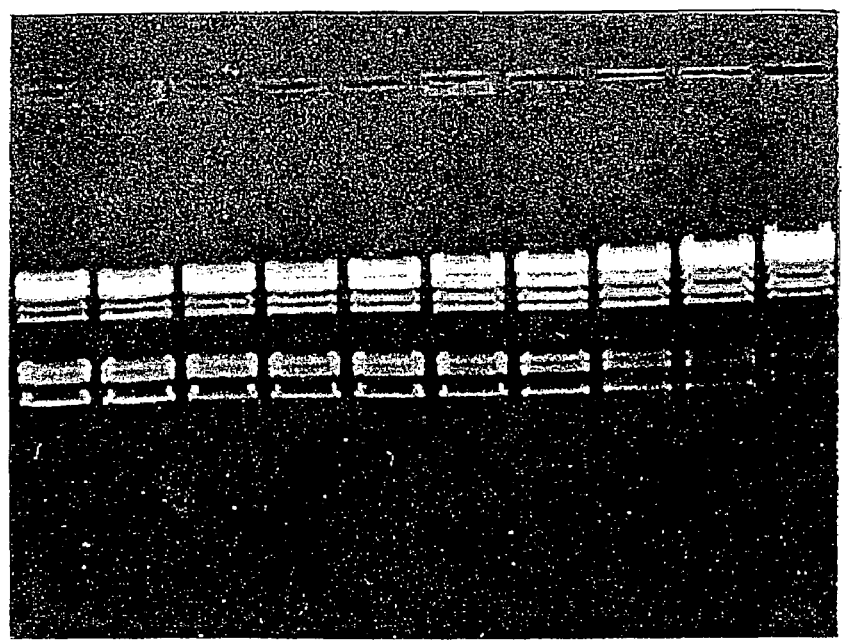

This application is a continuation, of application Ser. No. 09/957,658, filed Sep. 17, 2001, which claims priority under 35 U.S.C. §119 to German patent application 100 46 034.8, filed Sep. 18, 2000, and which is incorporated herein by reference.

The present invention relates to the use of food colours to dye enzyme solutions, to enzyme solutions provided with food colours as well as their use.

DE 197 37 173 A1 relates to a microdispensing system for the dispensing of very small amounts of liquid. The system is used for example in molecular biology to carry out enzymatic reactions. The very small amounts of liquid (e.g. enzyme solutions) are fed in measured quantities into a reaction vessel using a free-jet dosing apparatus e.g. electrostatically, piezo-electrically or thermomechanically, the nozzle of the free-jet dosing apparatus having to be positioned exactly centrally over the reaction vessel, in order to guarantee that the dispensed liquid is actually introduced into the reaction mixture and does not remain completely or partly suspended on the wall of the reaction vessel, without coming into contact with the solution.

The object of the present invention is thus to create a possibility for the person skilled in the art to test the dispensing of the amounts of liquid using the aforementioned microdispensing system, i.e. in order to be able to judge whether the dispensed sample volumes have also actually been completely added to the reaction mixture.

The object is achieved according to the invention by an enzyme solution which contains one or more food colours, preferably one or more food colours according to Annex I for EC directive 94/36 of 30 Jun. 1994 (in the version published on 10 Sep. 1994 in the Official Journal No. L 237 (p. 0013-0029) of the European Communities), which is incorporated herein by reference. Among the particularly preferably used food colours are azo dyes and triarylmethane dyes which are soluble in water and distinguish themselves among food colours due to their depth of colour, i.e. the very high molar extinction coefficient. Only small amounts of dye are necessary, in order to achieve a sufficient colouring (cf. e.g. Ullmann—Encyklopädie der technischen Chemie, $4^{th}$ Edition, Verlag Chemie 1974, Volume 8, pp. 260 ff).

According to a particularly preferred version of the invention, the food colours are selected from the group consisting of Ponceau 4R (E124), Patent Blue (E131) and tartrazin (E102). Practically any shades can be mixed from those three basic colours.

There are no limitations whatsoever with regard to the enzyme. The enzyme solution contains one or more enzymes, such as e.g. enzymes from the group consisting of restriction enzymes and polymerases.

The enzyme solutions according to the invention are characterized in particular in that they show no loss of activity even during prolonged storage periods (or only a slight loss of activity, mainly under 20%).

With regard to the amount of colour used, there are no limitations whatsoever according to the invention. For use in conjunction with the microdispensing system of DE 197 37 173 A1, a minimum quantity has proved to be advantageous which allows a colouring of a drop to be just recognisable visually against a white background. It is not necessarily required that a shade can also still be recognised after mixing the dyed enzyme solution with the reaction mixture.

The invention further relates to the use of the above-named enzyme solutions in a microdispensing system according to DE 197 37 173 A1, which is incorporated herein by reference. The dying of the enzyme solution produces the following advantages as regards handling: The very small drops (up to 10 nl) dispensed using this system can be recognised only with difficulty when uncoloured. The dying of the enzyme solution facilitates the effortless control of the results, namely a) whether the drop was dispensed and b) whether it reached the correct position.

The subject-matter of the present invention is thus furthermore the use of the above-named food colours for the preparation of enzyme solutions, preferably for use in a microdispensing system according to DE 197 37 173 A1. The enzyme solutions can contain one or more enzymes, such as e.g. from the group consisting of restriction enzymes and polymerases.

Annex I ("List of Permitted Food Colours") of EC directive 94/36 of Jun. 30, 1994, lists the following food colors:

| EC No. | Common Name | Colour Index number |
|---|---|---|
| E100 | curcumin | 75300 |
| E101 | riboflavin, riboflavin-5'-phosphate | |
| E102 | tartrazine | 19140 |
| E104 | quinoline yellow | 47005 |
| E110 | Sunset Yellow FCF, Orange Yellow S | 15985 |
| E120 | cochineal, carminic acid, carmines | 75470 |
| E122 | azorubine, carmoisine | 14720 |
| E123 | amaranth | 16185 |
| E124 | Ponceau 4R, Cochineal Red A | 16255 |
| E127 | erythrosine | 45430 |
| E128 | Red 2G | 18050 |
| E129 | Allura Red AC | 16035 |
| E131 | Patent Blue V | 42051 |
| E132 | indigotine, indigo carmine | 73015 |
| E133 | Brilliant Blue FCF | 42090 |
| E140 | chlorophylls | 75810 |
| E140 | chlorophyllins | 75815 |
| E141 | copper complexes of chlorophylls | 75815 |
| E141 | copper complexes of chlorophyllins | 75815 |
| E142 | Green[s] S | 44090 |
| E150a | plain caramel | |
| E150b | caustic sulphite caramel | |
| E150c | ammonia caramel | |
| E150d | sulphite ammonia caramel | |
| E151 | Brilliant Black BN, Black PN | 28440 |
| E153 | vegetable carbon | |
| E154 | Brown FK | |
| E155 | Brown HT | 20285 |
| E160a | mixed carotenes | 75130 |
| E160a | beta-carotene | 40800 |
| E160b | annatto, bixin, norbixin | 75120 |
| E160c | paprika extract, capsanthin, capsorubin | |
| E160d | lycopene | |
| E160e | beta-apo-8'carotenal (C30) | 40820 |
| E160f | ethyl ester of beta-apo-8'carotenal (C30) | 40825 |
| E161b | lutein | |
| E161g | canthaxanthin | |
| E162 | beetroot red, betanin | |
| E163 | anthocyanins | |
| E170 | calcium carbonate | 77220 |
| E171 | titanium dioxide | 77891 |
| E172 | iron oxides and hydroxides | 77491, 77492, and 77499 |
| E173 | aluminum | |
| E174 | silver | |
| E175 | gold | |
| E180 | Litholrubine BK | |

As used herein, the term "caramel" relates to products of a more or less intense brown color intended for coloring. It does not correspond to the sugary aromatic product obtained from heating The invention is explained in more detail in the following examples.

EXAMPLES

1) Materials and Methods:

Restriction Enzymes (Roche Basel, Switzerland) and Dilution Buffers:

Bam H1, 10 units/µl (No. 567 604, dilution buffer=P2)
Cla 1, 10 units/µl (No. 404 217, dilution buffer=P1)
Dra 1, 10 units/µl (No. 779 695, dilution buffer=P1)
Eco R1, 10 units/µl (No. 1 175 084, dilution buffer=P3)

Colours:

All colours from Synopharm, 22882 Barsbüttel, Germany.
Ponceau 4R, No. 145 130, batch: 94030770
Patent blue, No. 700 141, batch: 95060280
Tartrazine, No. 145 160, batch: 96040020
Preparation of the Dyed Enzyme Solutions The three colours red, blue and yellow, and the mixture blue and yellow for the preparation of green, were added to the dilution buffers P1, P2 or P3 to be used according to the instructions of the manufacturer Roche to 0.5% (w/v) colour content.

1 part of corresponding, dyed dilution buffer was added to 9 parts of an enzyme solution. The colour of the dilution buffer corresponded to the code colours for the reaction buffers allocated to the enzymes (blue for Bam H1, red for Cla 1, green for Dra 1, red for Eco R1).

Yellow is thus tested in the combination with blue.

Dyed enzyme solutions were thus prepared which contained 550 ppm colour.

Mixtures of 9 parts of the enzyme solutions used with 1 part of the corresponding undyed buffer were used as reference.

Measurement of the Enzyme Activity:

The enzyme activity was measured by digestion of λ-DNA in the form of a time series.

The rate of reaction of the dyed enzyme solution can be compared with the undyed reference from the gelectrophoretic image of the reaction stopped at 8 to 10 successive time points. The rate of reaction is at a first approximation inversely proportional to the time which is required for the digestion of the substrate.

The Roche buffers, modified by an addition of 0.02% Tween 20 and 2% of the corresponding dilution buffers, were used as reaction buffers.

Figure 1B:
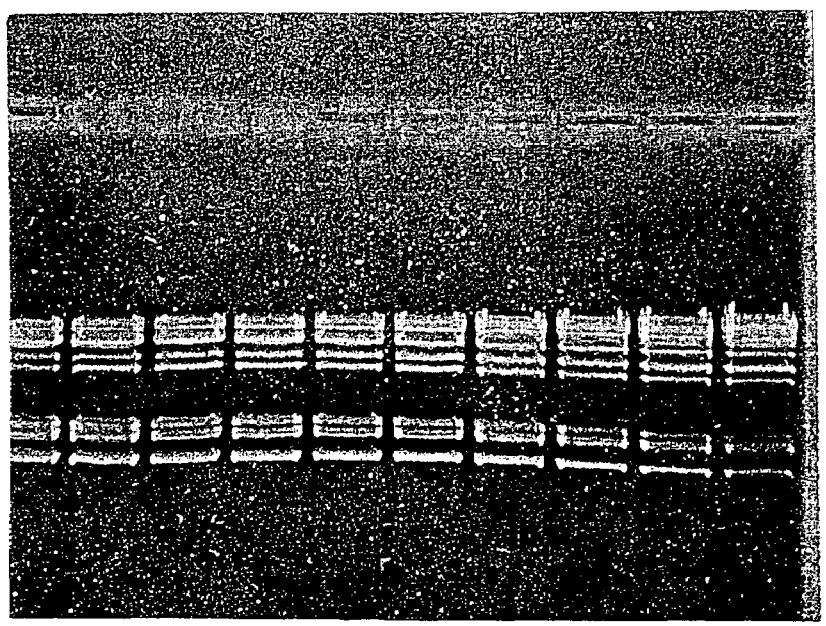
Figure 2A:
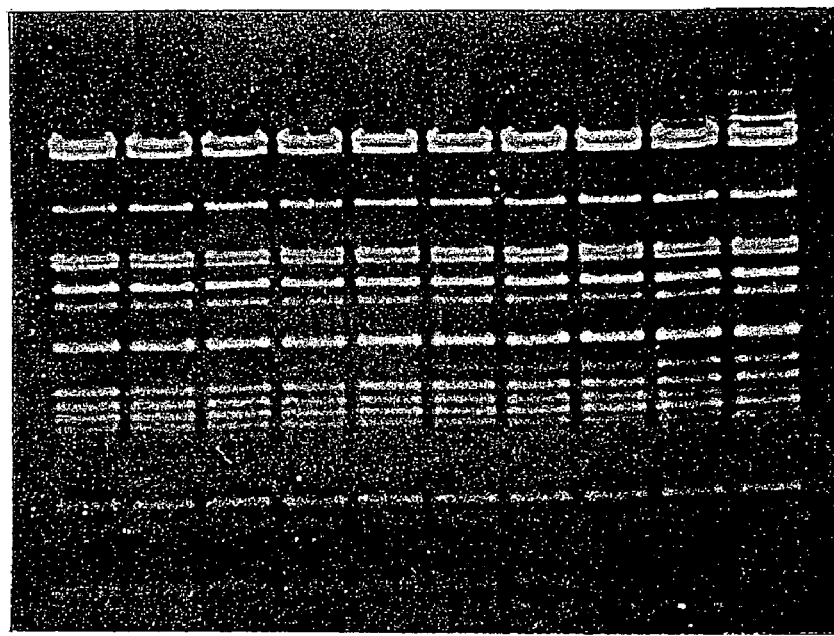
Figure 2B:
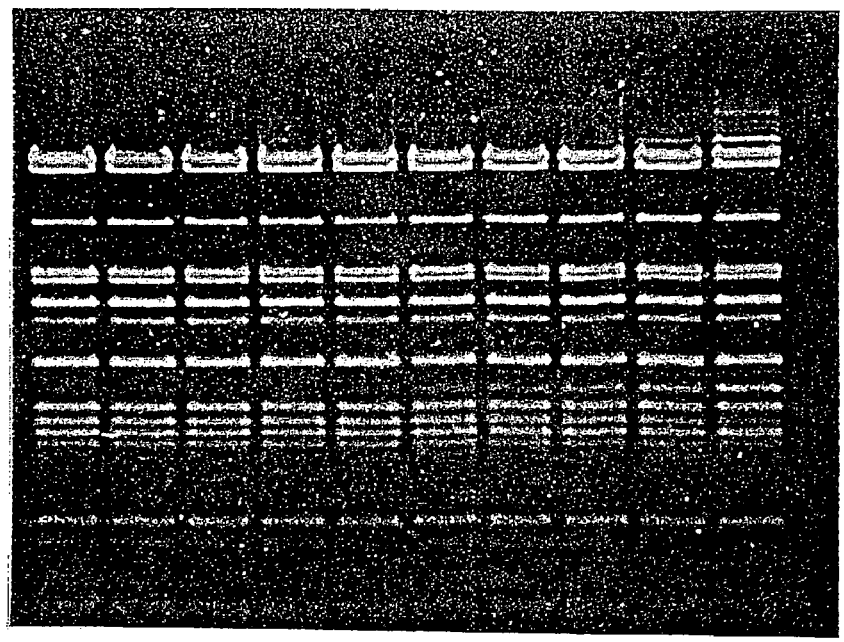
Figure 3A:
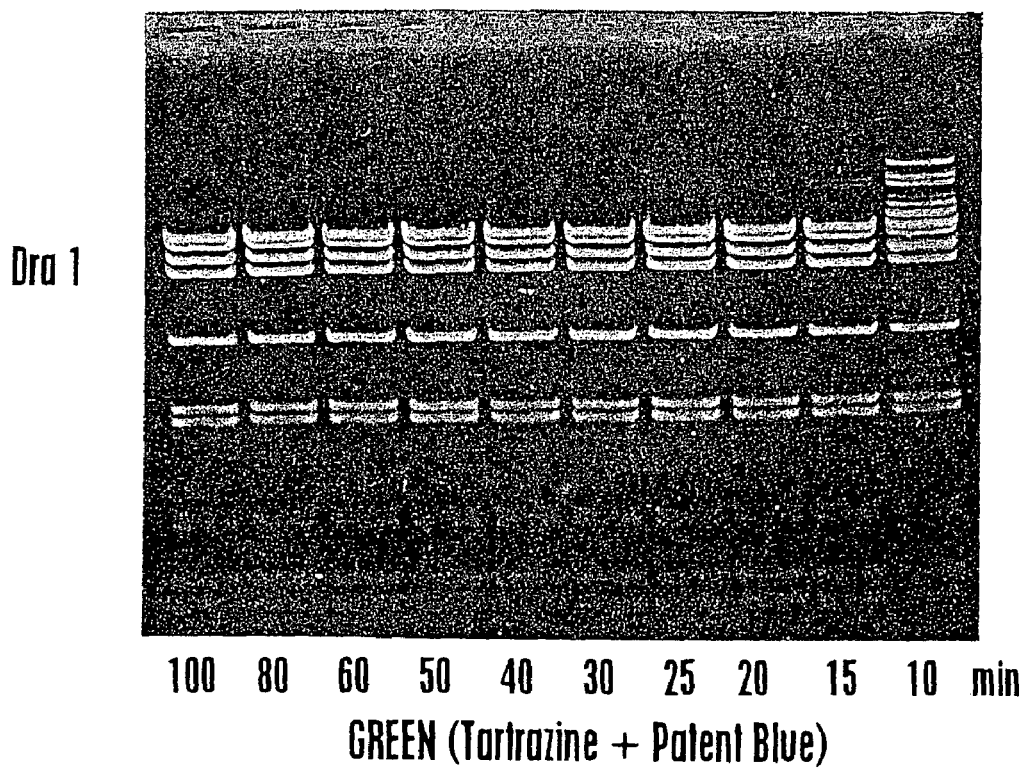
Figure 3B:
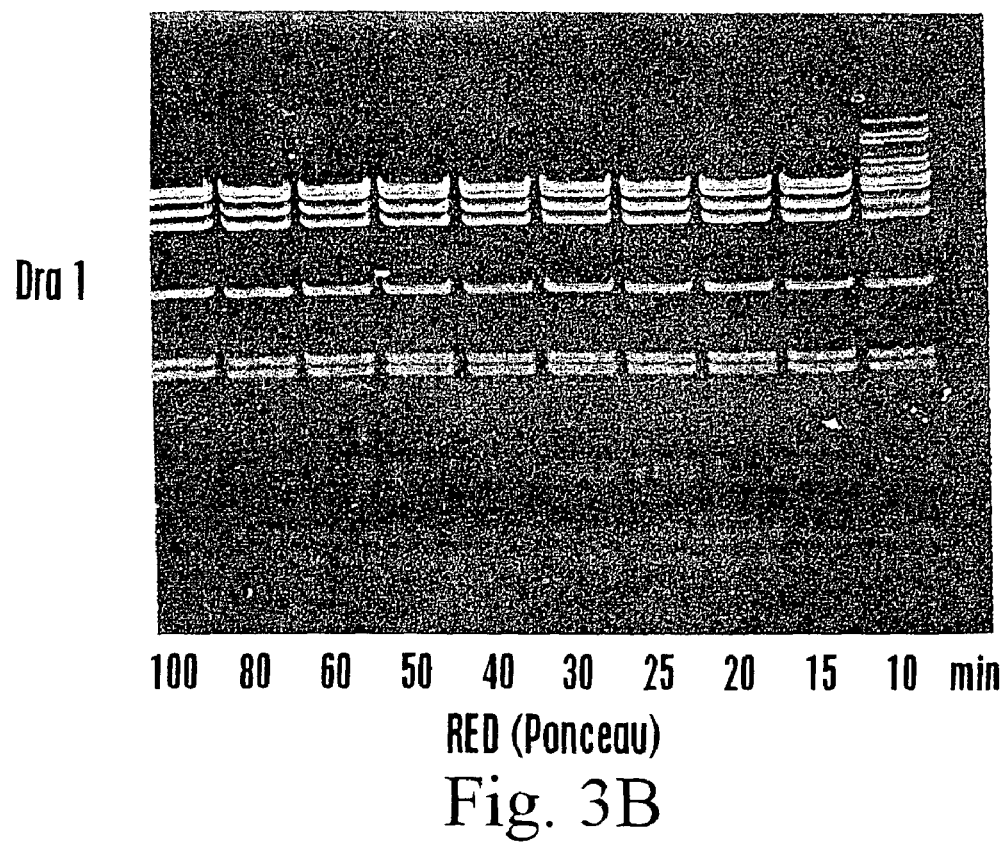
Figure 3C:
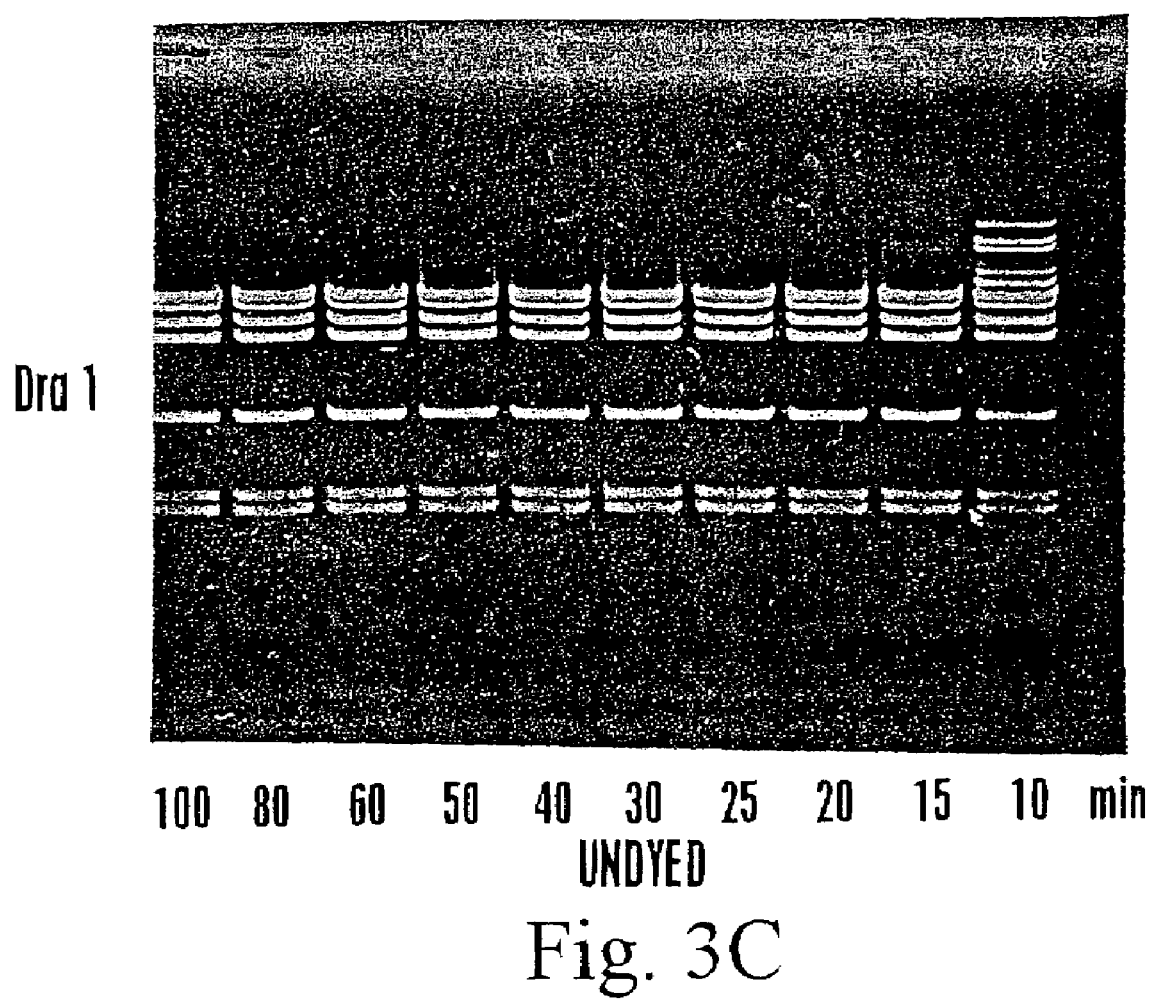
Figure 4A:
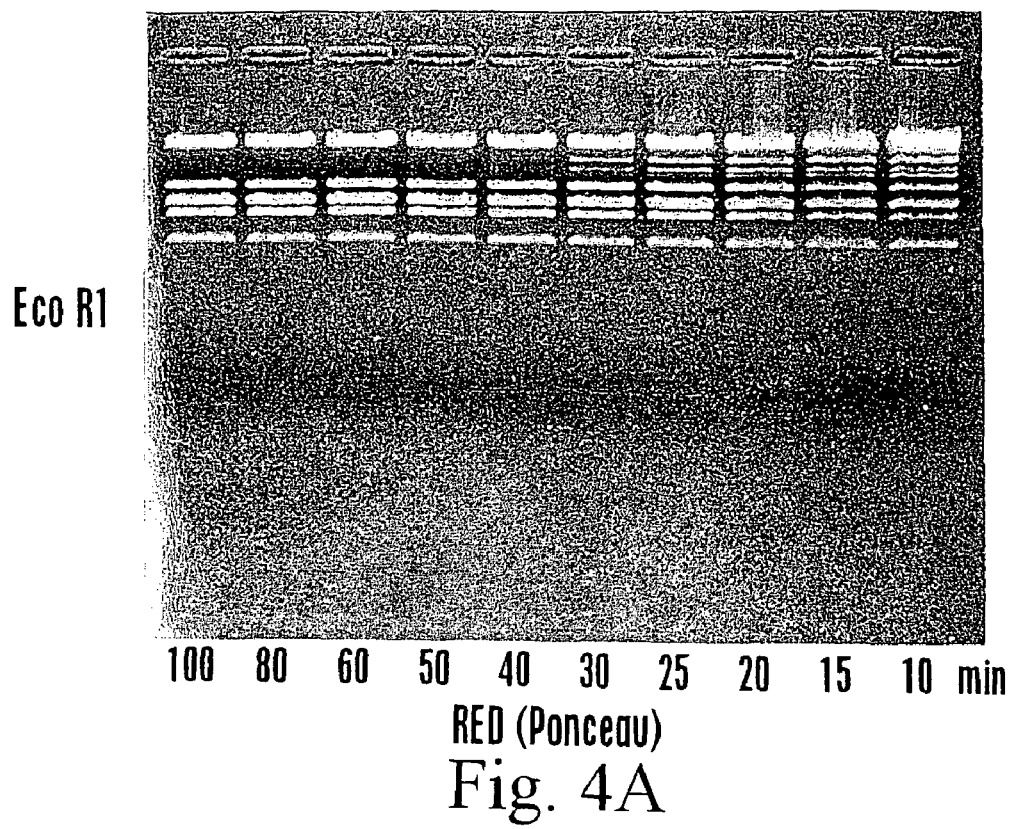
Figure 4B:
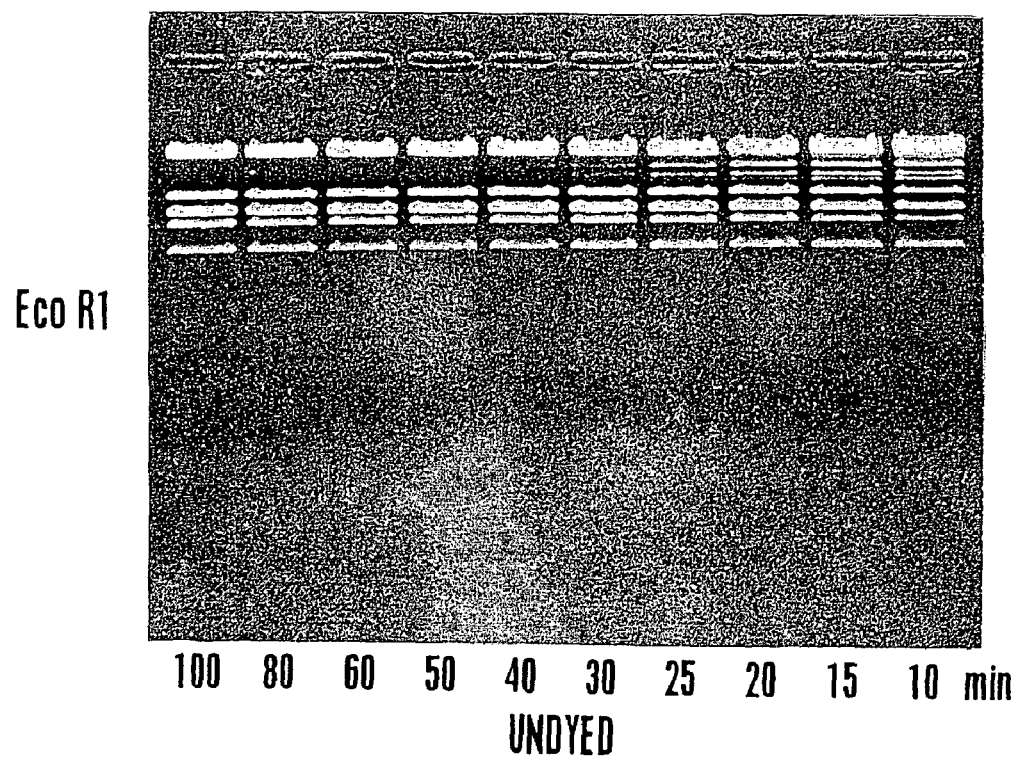
Figure 5A:
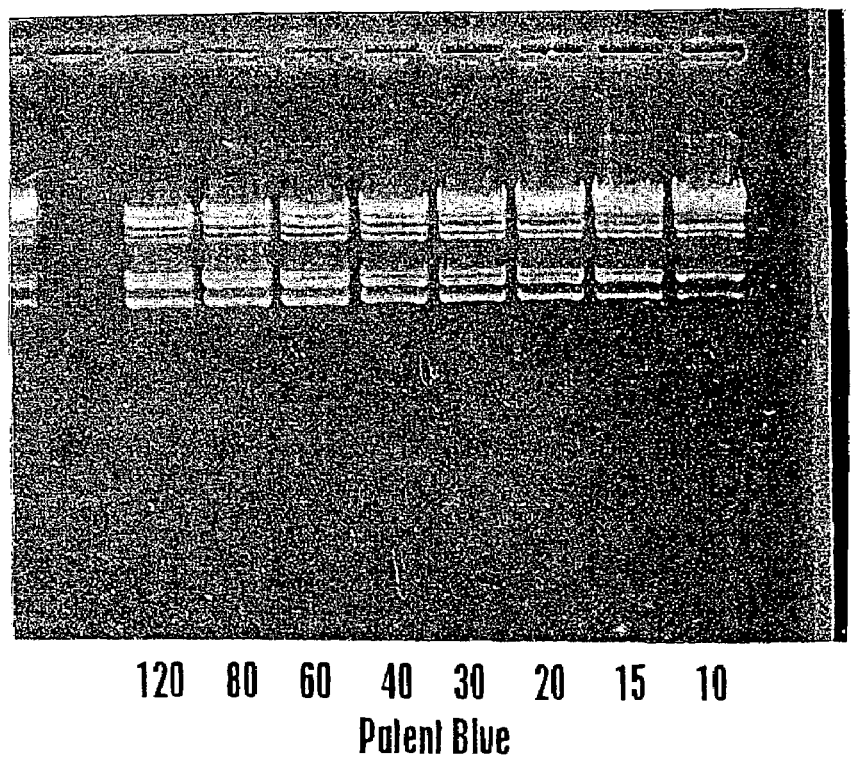
Figure 5B:
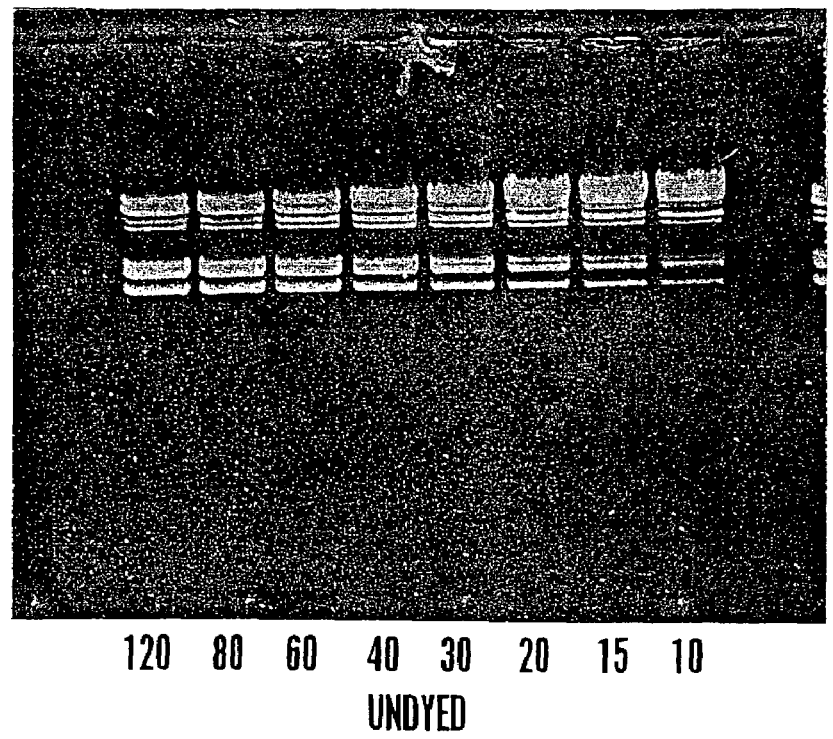
Figure 6A:
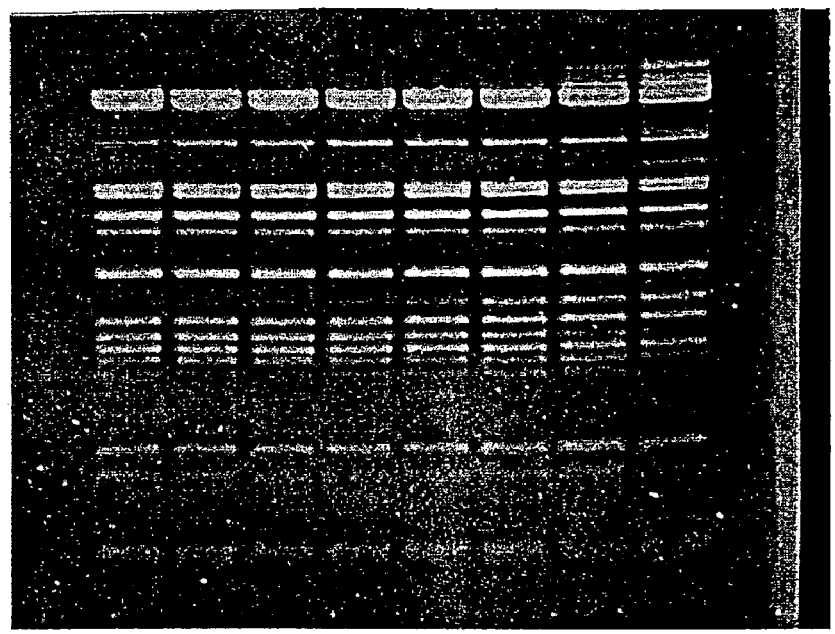
Figure 6B:
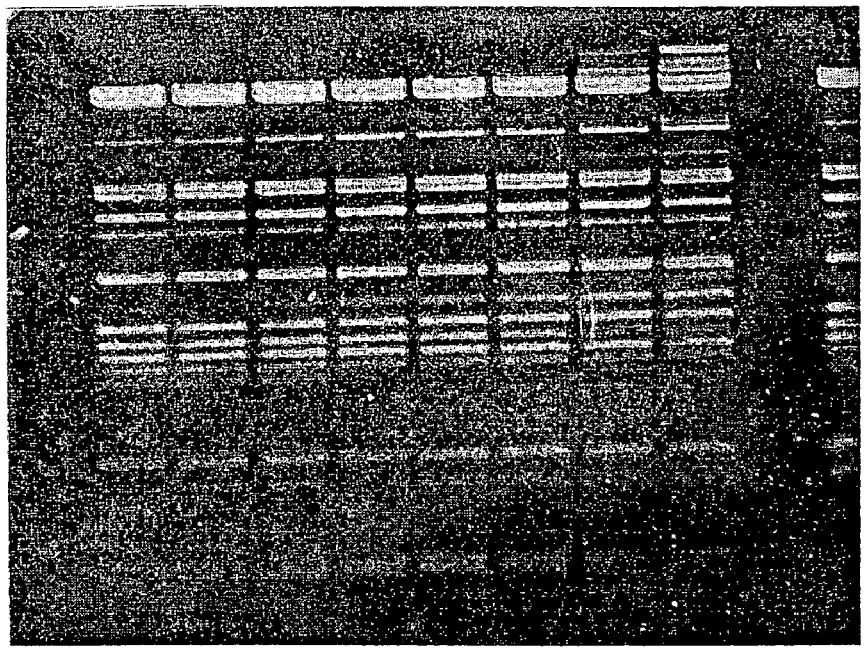
Figure 7A:
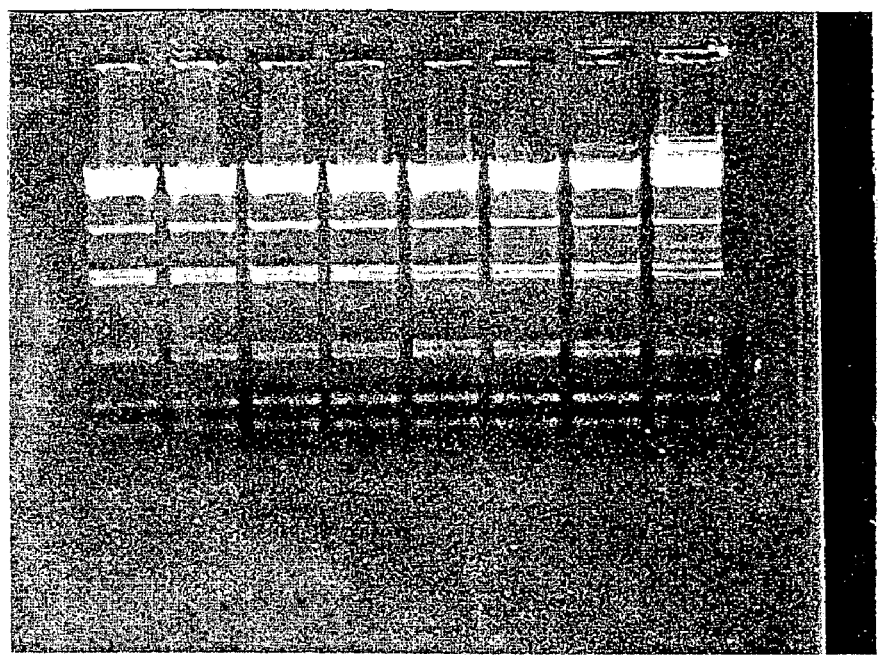
Figure 7B:
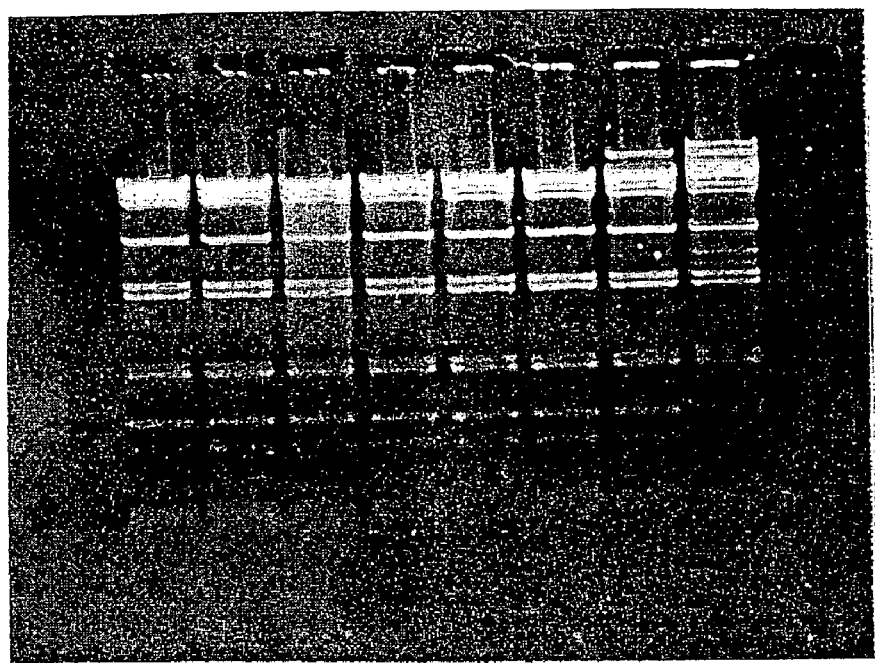
Figure 8A:
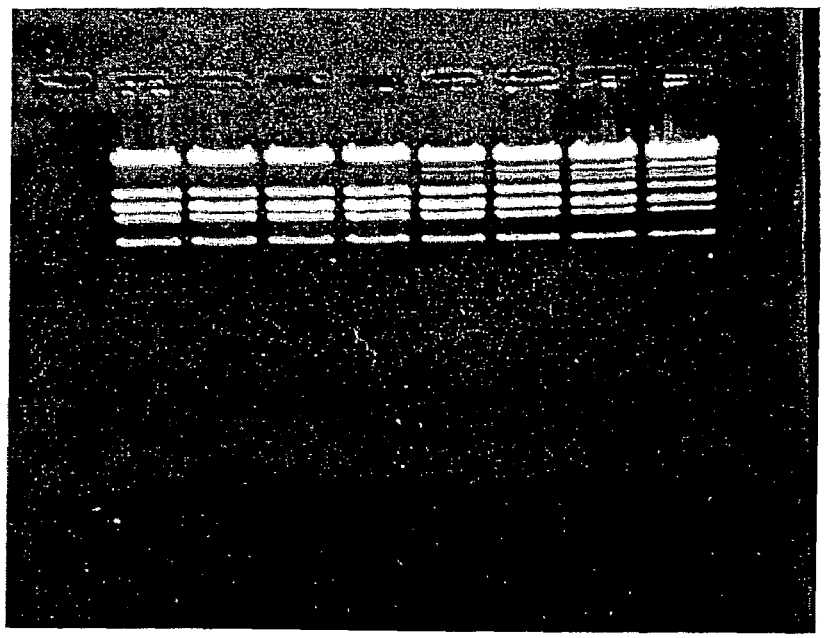
Figure 8B:
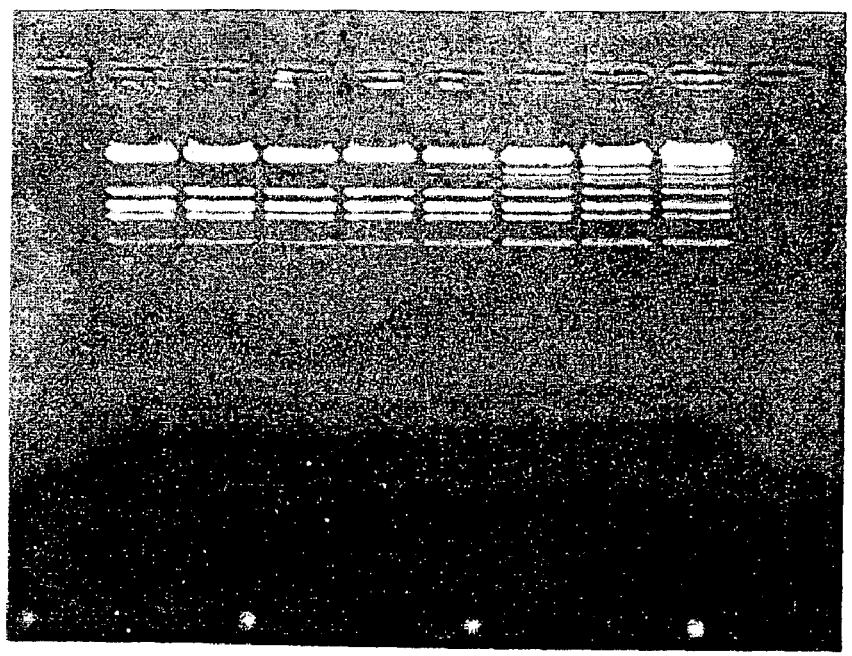

2) Results:

FIGS. 1 to 4 show the rates of the digestion of λ-DNA for the 4 enzymes after 1 week's storage at −21° C., FIGS. 5 to 8 after almost a half-year's storage at −21° C.

A change in the activity of the enzymes caused by the presence of the colours used cannot be recognised, at both points in time the rate of digestion by dyed and undyed enzyme solution is the same.

The invention claimed is:

1. A method for storing a restriction enzyme comprising adding to the restriction enzyme a food color, wherein the enzyme when stored shows no loss or less than 20% loss of activity after prolonged storage, and wherein the food color is Ponceau 4R.

2. The method of claim 1, further comprising patent blue.

3. The method of claim 1, further comprising tartazine.

4. A method for storing a restriction enzyme comprising adding to the restriction enzyme a food color, wherein the enzyme when stored shows no loss or less than 20% loss of activity after prolonged storage, and wherein the food color is patent blue.

5. The method of claim 4, further comprising tartazine.

* * * * *